US00RE38228E

(19) United States
(12) Reissued Patent
Hirose et al.

(10) Patent Number: US RE38,228 E
(45) **Date of Reissued Patent: *Aug. 19, 2003**

(54) POLISHING APPARATUS

(75) Inventors: Masayoshi Hirose, Tokyo (JP); Seiji Ishikawa, Tokyo (JP); Norio Kimura, Tokyo (JP); Kiyotaka Kawashima, Tokyo (JP); You Ishii, Tokyo (JP)

(73) Assignee: Ebara Corporation, Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/789,304

(22) Filed: Jan. 30, 1997

Related U.S. Patent Documents

Reissue of:
(64) Patent No.: 5,384,986
Issued: Jan. 31, 1995
Appl. No.: 08/124,648
Filed: Sep. 22, 1993

(30) Foreign Application Priority Data

Sep. 24, 1992 (JP) ..... 4-279343
Sep. 25, 1992 (JP) ..... 4-280491

(51) Int. Cl.[7] ..... B24B 1/00
(52) U.S. Cl. ..... 451/56
(58) Field of Search ..... 457/444, 443, 457/285–289, 41, 60, 446, 56, 57, 67, 28

(56) References Cited

U.S. PATENT DOCUMENTS

| | | | | | |
|---|---|---|---|---|---|
| 2,079,076 A | | 5/1937 | Kranich | 51/241 |
| 3,515,115 A | * | 6/1970 | Boettcher | 451/443 |
| 3,568,371 A | * | 3/1971 | Day et al. | 51/132 |
| 3,753,269 A | * | 8/1973 | Budman | 51/262 A |
| 4,438,601 A | * | 3/1984 | Olson | 51/262 A |
| 4,583,325 A | * | 4/1986 | Tabuchi | 51/131.5 |
| 4,935,981 A | * | 6/1990 | Ohtani et al. | 15/21 |
| 5,154,021 A | * | 10/1992 | Bombardier et al. | 51/262 A |
| 5,245,796 A | * | 9/1993 | Miller et al. | 451/41 |
| 5,291,693 A | * | 3/1994 | Nguyen | 451/41 |
| 5,320,706 A | * | 6/1994 | Blackwell | 156/636 |
| 5,329,732 A | | 7/1994 | Karlsrud et al. | |
| 6,099,386 A | * | 8/2000 | Tsai et al. | 451/8 |

FOREIGN PATENT DOCUMENTS

| | | | | |
|---|---|---|---|---|
| EP | 0366027 | * | 5/1990 | |
| EP | 0517033 | * | 12/1992 | |
| GB | 549604 | * | 3/1946 | |
| GB | 2149330 | * | 6/1985 | 451/41 |
| JP | 51-39497 | * | 9/1974 | |
| JP | 57-86748 | * | 5/1982 | |
| JP | 57-149158 | | 9/1982 | |
| JP | 59-134650 | | 8/1984 | |
| JP | 62-102973 | | 5/1987 | |
| JP | 62-162460 | | 7/1987 | |
| JP | 63-97454 | * | 6/1988 | |
| JP | 435870 | * | 2/1992 | 51/262 A |

* cited by examiner

*Primary Examiner*—Robert A. Rose
*Assistant Examiner*—George Nguyen
(74) *Attorney, Agent, or Firm*—Armstrong, Westerman & Hattori, LLP.

(57) ABSTRACT

A turntable with an abrasive cloth mounted thereon and a top ring positioned above the turntable are independently rotatably provided. The top ring holds a workpiece to be polished and presses the workpiece against the abrasive cloth. The turntable and the top ring are rotated to polish the surface of the workpiece to a flat mirror finish on the abrasive cloth. A rotatable brush pressed against the abrasive cloth is rotated about an axis substantially perpendicularly to the plane of the abrasive cloth, and oscillated substantially radially between radially inner and outer positions over the abrasive cloth. A cleaning solution is sprayed from a nozzle onto the abrasive cloth. The turntable has a bank along an outer circumferential edge thereto for preventing a protective solution, which is supplied to the abrasive cloth to keep the abrasive cloth wet and prevent it, from flowing off the turntable when the turntable is stationary.

24 Claims, 7 Drawing Sheets

POLISHING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a polishing apparatus in general and more particularly to a polishing apparatus for polishing a workpiece such as a semiconductor wafer to a flat mirror finish with an abrasive cloth.

2. Description of the Related Art

Recent rapid progress in semiconductor device integration demands smaller and smaller wiring patterns or interconnections and also narrower spaces between interconnections which connect active areas. One of the processes available for forming such interconnection is photolithography. Though the photolithographic process can form interconnections that are at most 0.5 $\mu$m wide, it requires that surfaces on which pattern images are to be focused on by a stepper be as flat as possible because the depth of focus of the optical system is relatively small.

It is therefore necessary to make the surfaces of semiconductor wafers flat for photolithography. One customary way of flattening the surface of semiconductor wafers is to polish with a polishing apparatus.

Such a polishing apparatus has a turntable and a top ring that rotate at respective individual speeds. An abrasive cloth is attached to the upper surface of the turntable. A workpiece such as a semiconductor wafer to be polished is placed on the abrasive cloth and clamped between the top ring and the turntable. During the operation, the top ring exerts a constant pressure to the turntable, and a slurry-like abrasive material is sprayed from a nozzle over the abrasive cloth. The abrasive material enters the gap between the abrasive cloth and the workpiece. The surface of the workpiece held against the abrasive cloth is therefore polished while the top ring and the turntable are rotating.

As the polishing process progresses, the abrasive cloth is clogged with abrasive grains contained in the abrasive material. At certain intervals, therefore, the abrasive cloth should be dressed to make itself ready for reuse by removing the clogging abrasive grains. For this purpose, the polishing apparatus is usually equipped with a dressing device.

FIGS. 7(a) and 7(b) of the accompanying drawings show a conventional dressing device for dressing an abrasive cloth. As shown in FIGS. 7(a) and 7(b), the dressing device has a brush 32 attached to an arm 31. To dress an abrasive cloth 34 mounted on an upper surface 33a of a turntable 33; the turntable 33 is rotated about its own axis, and the lower end of the brush 32 is held against the abrasive cloth 34. At the same time, a cleaning solution W such as pure water is ejected from a nozzle 35 onto the abrasive cloth 34.

The conventional dressing device is however disadvantageous in that it fails to clean the entire surface of the abrasive cloth 34 uniformly and cannot fully remove the abrasive grains which have embedded in the abrasive cloth This is because, as shown in FIG. 9(a), the abrasive cloth 34 is swept only in one direction depending on the rotational direction of the turntable 33, and hence the abrasive grains are removed from the abrasive cloth 34 only in one direction. Consequently, even though the abrasive cloth 34 is dressed by the dressing device, the abrasive cloth 34 has a relatively short service life, and must frequently be replaced.

Japanese laid-open utility model publication No. 63-97454 discloses another conventional dressing device. As shown in FIGS. 8(a) and 8(b) of the accompanying drawings, the conventional dressing device has a radial brush 42 mounted on a rotatable shaft 41. To dress an abrasive cloth 34 attached to an upper surface 33a of a turntable 33, the turntable 33 is rotated about its own axis, and the brush 42 is rotated by the shaft 41 about the axis of the shaft 41. While the brush 42 is being held in contact with the abrasive cloth 34, a cleaning solution W such as pure water is ejected from a nozzle 35 onto the abrasive cloth 34.

The dressing device shown in FIGS. 8(a) and 8(b) has a similar problem inn that it fails to achieve uniform cleaning of the entire surface of the abrasive cloth 34 and full removal of the abrasive grains which have stuck to the abrasive cloth 34. This is also because, as shown in FIG. 9(b), the abrasive cloth 34 is napped only in one direction depending on rotational directions of the turntable 33 and the brushes 42, and hence the abrasive grains are removed from the abrasive cloth 34 only in one direction.

Furthermore, as shown in FIGS. 7(a), 7(b) and 8(a), 8(b), when the turntable 33 is stopped at the end of a polishing process, the abrasive cloth 34 quickly dries because the solution in the slurry-like abrasive material that has seeped in the abrasive cloth 34 evaporates, Repeated drying cycles make the abrasive cloth 34 relatively short in service life.

SUMMARY OF THE INVENTION

It is therefore an object of the present invention to provide a polishing apparatus which as a dressing device capable of uniformly cleaning the entire surface of an abrasive cloth and effectively removing abrasive grains from the abrasive cloth thereby to reliably prepare the abrasive cloth in readiness for reuse.

Another object of the present invention is to provide a polishing apparatus which can prevent an abrasive cloth mounted on an upper surface of a turntable from drying.

According to an aspect of the present invention, there is provided a polishing apparatus for polishing a surface of a workpiece, comprising: a turntable with an abrasive cloth mounted on an upper surface thereof; a top ring positioned above the turntable for supporting the workpiece to be polished and pressing the workpiece against the abrasive cloth; a rotatable brush facing the abrasive cloth; first actuating means for rotating the rotatable brush about an axis substantially perpendicular to the plane of the abrasive cloth; second actuating means for reciprocally moving the rotatable brush substantially radially between radially inner and outer positions over the abrasive cloth; and a nozzle for supplying a cleaning solution onto the abrasive cloth.

During the operation of the polishing apparatus, the brush as it is held against the abrasive cloth is rotated about an axis substantially perpendicular to the plane of the abrasive cloth, and is oscillated substantially radially between radially inner and outer positions over the abrasive cloth for thereby dressing the abrasive cloth. Therefore, the abrasive cloth is swept in opposite directions by the rotating brush, reliably removing clogging abrasive grains which may have stuck to and been attached to the abrasive cloth.

According to another aspect of the present invention, there is provided a polishing apparatus for polishing a surface of a workpiece, comprising: a turntable with an abrasive cloth mounted on an upper surface thereof; a top ring positioned above the turntable for supporting the workpiece to be polished and pressing the workpiece against the abrasive cloth; and a bank provided on the turntable along an outer circumferential edge thereof for preventing a protective solution, which is supplied to said abrasive cloth to keep the abrasive cloth from drying when the turntable is held at rest, from flowing off the turntable, the bank having a slanted surface inclined downwardly in a radially inward direction of the turntable for allowing the protective solution to be scattered away from the turntable over the slanted surface under centrifugal forces when the turntable is rotated.

When the turntable is held at rest with no polishing process being carried out, a protective solution such as pure water is put over the abrasive cloth to keep the abrasive cloth from drying. The supplied protective solution is prevented from flowing off the turntable by the bank along the outer circumferential edge of the turntable. Therefore, the abrasive cloth is reliably prevented from drying while it is not in use. When the turntable is rotated to polish a workpiece, the protective solution is scattered away from the turntable over the bank under centrifugal forces. Therefore, the protective solution is not left on the surface of the abrasive cloth and does not obstruct the polishing process. The slanted surface of the bank allows the protective solution to be smoothly discharged off the turntable upon rotation of the turntable.

According to still another aspect of the present invention, there is provided a polishing apparatus for polishing a surface of a workpiece, comprising: a turntable with an abrasive cloth mounted on an upper surface thereof; a top ring positioned above the turntable for supporting the workpiece to be polished and pressing the workpiece against the abrasive cloth; a rotatable brush facing the abrasive cloth; first actuating means for rotating the rotatable brush about an axis substantially perpendicular to the plane of the abrasive cloth; second actuating means for reciprocally moving the rotatable brush substantially radially between radially inner and outer positions over the abrasive cloth; and a nozzle for supplying a cleaning solution onto the abrasive cloth; and a bank provided on the turntable along an outer circumferential edge thereof for preventing a protective solution, which is supplied to the abrasive cloth to keep the abrasive cloth from drying when the turntable is held at rest, from flowing off the turntable, the bank having a slanted surface inclined downwardly in a radially inward direction of the turntable for allowing the protective solution to be scattered away from the turntable over the slanted surface under centrifugal forces when the turntable is rotated.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
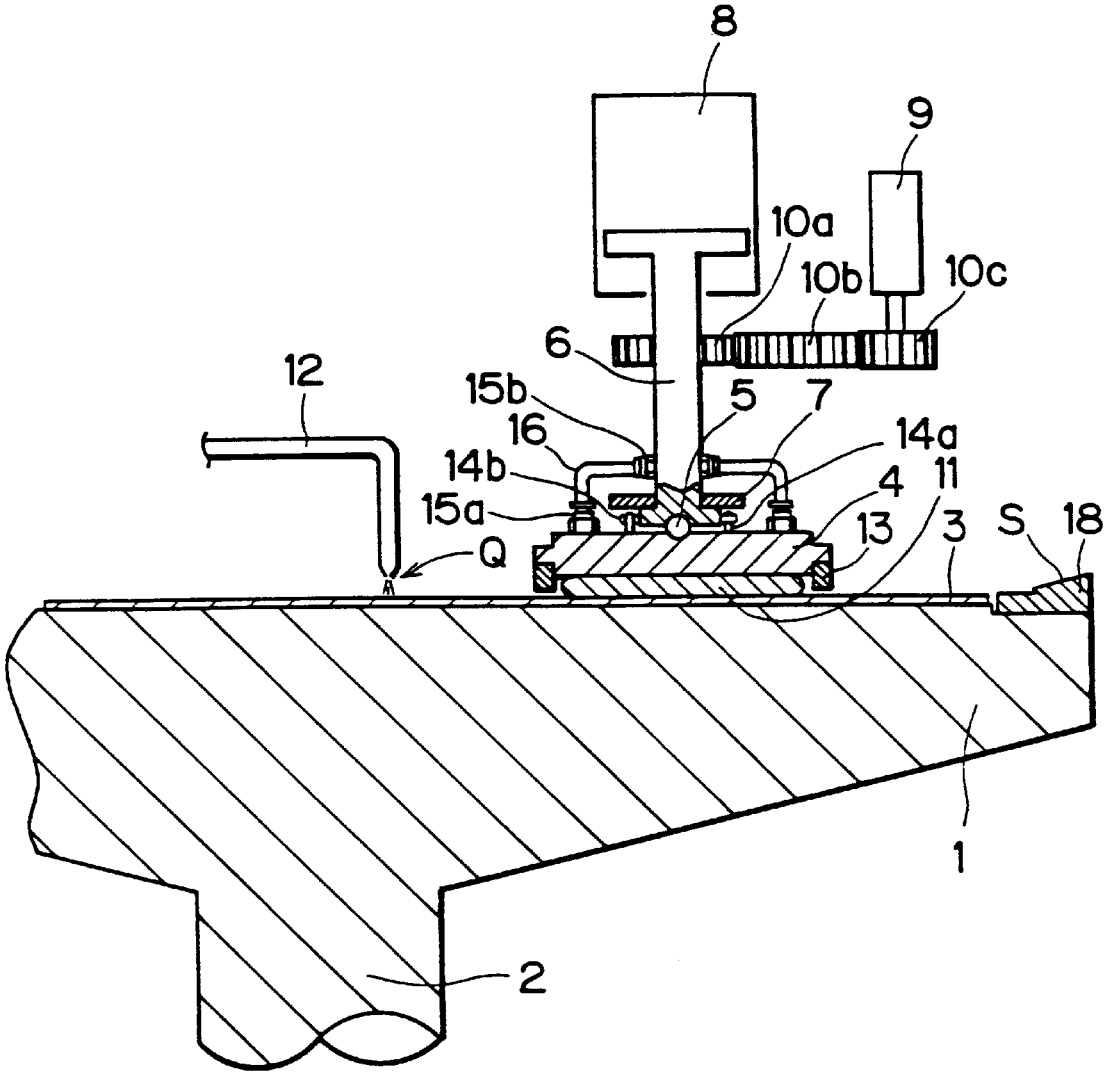
FIG. 1 is a vertical cross-sectional view of a polishing apparatus according to the present invention.

As shown in FIG. 1, a polishing apparatus according to the present invention comprises a turntable 1 mounted on the upper end of a shaft 2 which is rotatable about its own axis by a motor (not shown) coupled to the shaft 2. An abrasive cloth 3 is attached to the upper surface of the turntable 1. The polishing apparatus also has a top ring 4 disposed above the turntable 1 and coupled by a top ring holder 7 to the lower end of a vertical top ring drive shaft 6 through a spherical bearing 5. The top ring drive shaft 6 has a piston on its upper end which is slidably disposed in a vertical pressure cylinder 8. The pressure cylinder 8 is supplied with a fluid medium under pressure to lower the top ring drive shaft 6, and thereby pressing the top ring 4 against the turntable 1 under a constant pressure. The top ring drive shaft 6 is rotatable about its own axis by a train of gears 10a, 10b, 10c which are rotatable by a motor 9. The gear 10a is coaxially mounted on the top ring drive shaft 6, and the motor 9 has its output shaft connected to the gear 10c.

An abrasive spray nozzle 12 is disposed above the turntable 1 for applying a slurry-like abrasive material Q onto the abrasive cloth 3 placed on the turntable 1. The abrasive material Q may be a mixture of pure water and $SiO_2$ (colloidal silica) or $CeO_2$-pure water, for example.

A retaining ring 13 for retaining a workpiece 11 such as a semiconductor wafer or the like which is to be polished is mounted on a lower peripheral edge of the top ring 4.

A pair of torque transmission pins 14a, 14b is mounted on the upper surface of the top ring 4 and engages the lower end of the top ring drive shaft 6 for transmitting the motor torque from the top ring drive shaft 6 to the top ring 4. Although not shown, the top ring 4 and the top ring drive shaft 6 have vacuum passages formed therein which are connected to a vacuum source, the vacuum passages in the top ring 4 being open at its lower surface. The vacuum passages in the top ring 4 and the top ring drive shaft 6 are connected by vacuum tubes 16 that are joined to the top ring 4 and the top ring drive shaft 6 by tube couplings 15a, 15b.

For polishing the workpiece 11, the workpiece 11 is attracted to the lower surface of the top ring 4 under a vacuum and held on the top ring 4. Then, the pressure cylinder 8 is actuated to lower and press the workpiece 11 against the abrasive cloth 3 on the turntable 1. At this time, the turntable 1 starts to rotate.

Then, the abrasive material Q is sprayed from the nozzle 12 onto the abrasive cloth 3. The applied abrasive material Q is retained in the abrasive cloth 3, and enters beneath the lower surface, which is to be polished, of the workpiece 11. As the turntable 1 is rotating, the lower surface of the workpiece 11 is polished by the abrasive material Q retained in the abrasive cloth 3. During the polishing process, the abrasive grains contained in the abrasive material Q stick to and are attached to the abrasive cloth 3.

Figure 2:
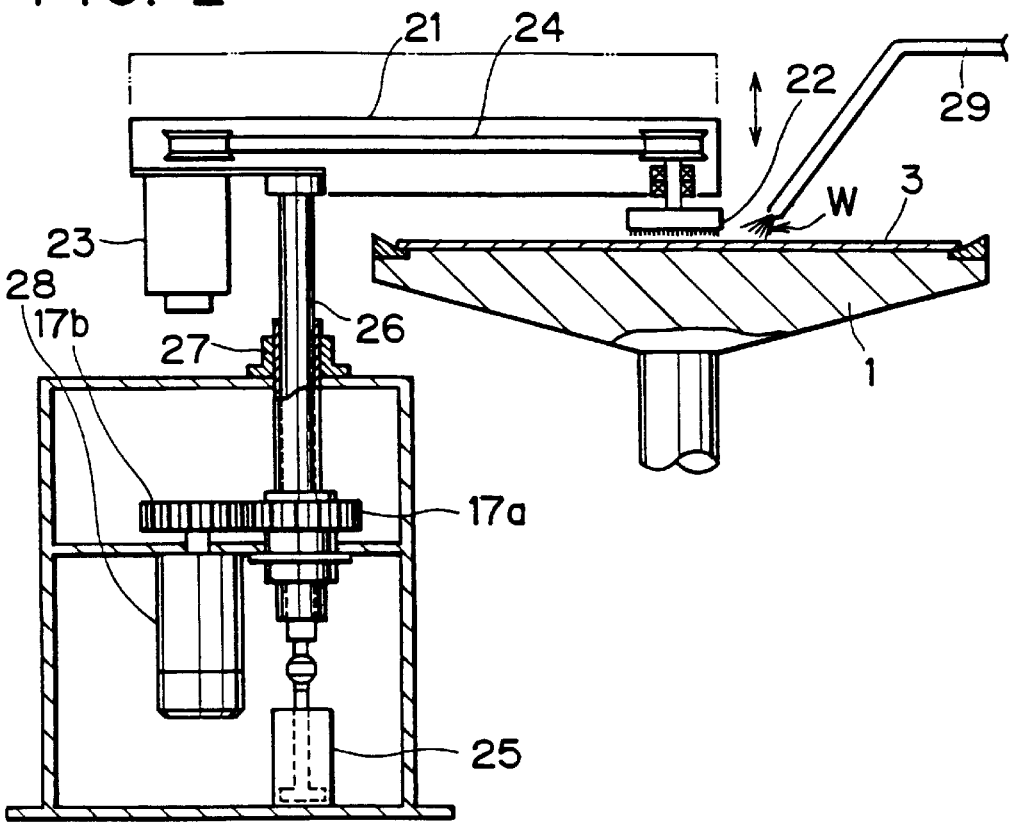
FIG. 2 is a vertical cross-sectional view of a dressing device incorporated in the polishing apparatus shown in FIG. 1.
Figure 3:
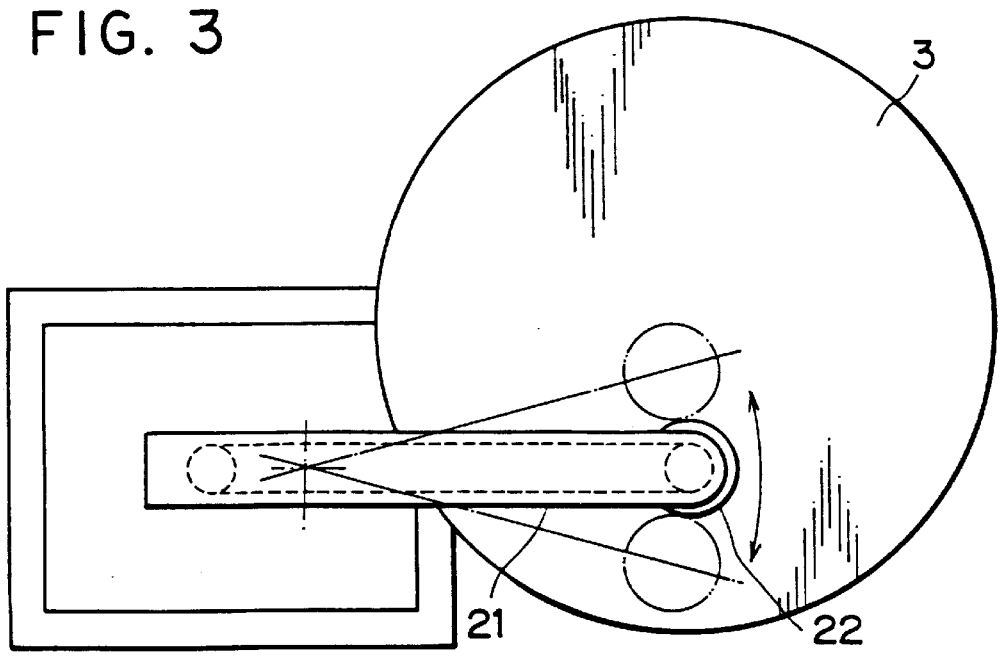
FIG. 3 is a plane view of the dressing device shown in FIG. 2.

The polishing apparatus shown in FIG. 1 has a dressing device shown in FIGS. 2 and 3 for dressing the abrasive cloth 3. As shown in FIGS. 2 and 3, the dressing device has an arm 21 supporting, on the end positioned over the turntable 1, a rotating brush 22 that is rotatable about a vertical axis extending substantially perpendicularly to the plane of the abrasive cloth 3. The rotating brush 22 faces toward the abrasive cloth 3. The arm 21 also supports, on its other end positioned radially outwardly of the turntable 1, a motor 23 for rotating the brush 22 through a timing belt 24 that is trained around pulleys coupled to the brush 22 and the motor 23, respectively.

The arm 21 is angularly and vertically-movably supported on the upper end of a vertical shaft 26 that is coupled at its lower end to the piston of an air cylinder 25. Therefore, the arm 21 and hence the brush 22 can be lifted and lowered by the air cylinders 25. The shaft 26 is vertically movably supported by a vertical sleeve 27 which is keyed or splined to the shaft 26. Therefore, the arm 21 can rotate with, and vertically move with respect to, the sleeve 27. The sleeve 27 is operatively connected through a train of intermeshing gears 17a, 17b to a reversible motor 28. Specifically, the gear 17a is co-rotatably mounted on the sleeve 27 and the gear 17b is fixed to the output shaft of the motor 28. When the motor 28 is energized, therefore, the sleeve 27 and hence the shaft 26 are rotated about the axis of the shaft 26 by the intermeshing gears 17a, 17b, for thereby angularly moving the arm 21 about the axis of the shaft 26. When the arm 21 is angularly moved, the brush 22 oscillates substantially radially between radially inner and outer positions over the abrasive cloth 3 as indicated by the arrow in FIG. 3.

Operation of the dressing device will be described below. When the motor 23 is energized, the brush 22 is rotated about its own axis through the timing belt 24. The air cylinder 25 is actuated to lower the shaft 26 until the lower end of the brush 22 contacts the abrasive cloth 3. The turntable 1 is rotated, and the motor 28 is energized to oscillate the arm 21, thus oscillating the brush 22 radially over the abrasive cloth 3. At this time, a cleaning solution W is sprayed from a nozzle 29 onto the abrasive cloth 3.

The rotation of the brush 22 in contact with the abrasive cloth 3 digs up the abrasive grains that have struck and been retained in the abrasive cloth 3. The abrasive grains which are removed from the abrasive cloth 3 are then expelled away from the turntable 1 by the cleaning solution W from the nozzle 29 and under centrifugal forces produced by the rotation of the turntable 1.

Figure 4A:
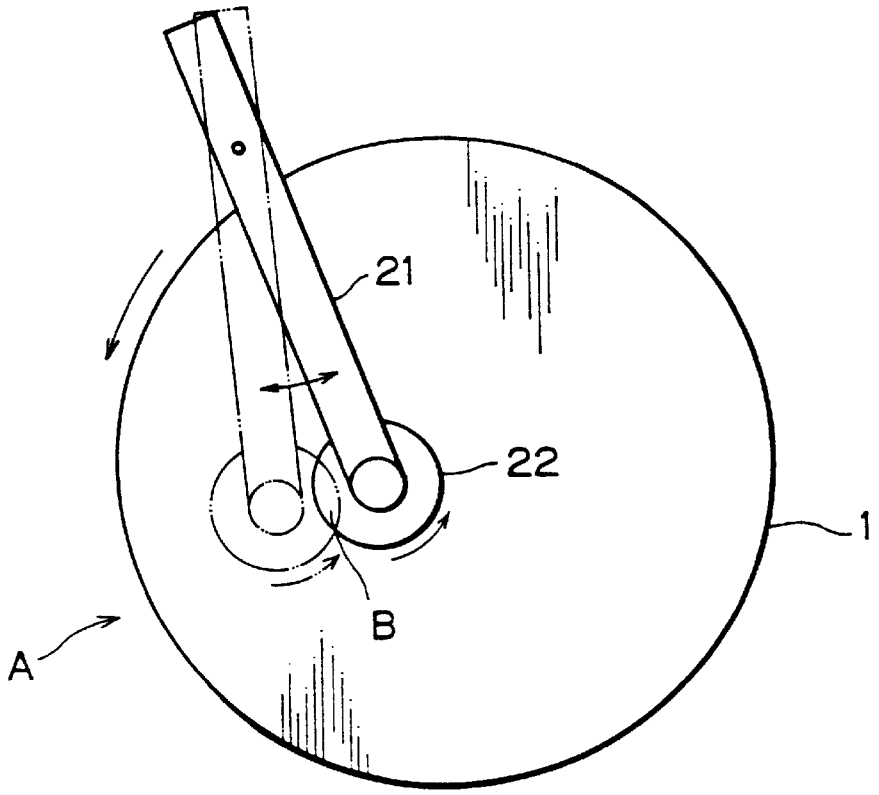
FIGS. 4(a), 4(b), and 4(c) are view showing the manner in which the dressing device shown in FIG. 2 operates.
Figure 4B:
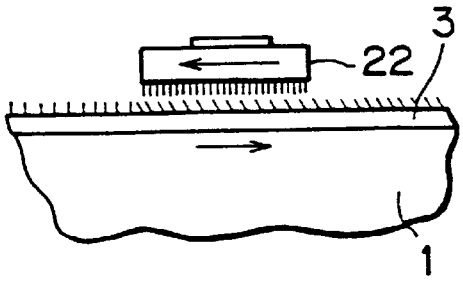
Figure 4C:
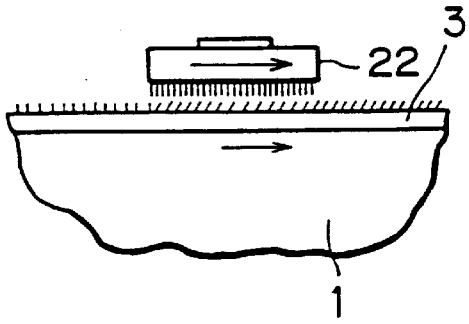

FIGS. 4(a) through 4(c) illustrate how the brush 22 of the dressing device operates when dressing the abrasive cloth 3. The brush 22 oscillates on the abrasive cloth 3 as indicated by the solid and dotted lines in FIG. 4(a). FIG. 4(b) shows the brush 22 as viewed in the direction indicated by the arrow A with respect to a position B (see FIG. 4(a)) when the brush 22 is in the solid-line position. FIG. 4(c) shows the brush 22 as viewed in the direction indicated by the arrow A with respect to the position B when the brush 22 is in the imaginary position. Study of FIGS. 4(a) through 4(c) indicates that the abrasive cloth 3 is napped in opposite directions when the brush 22 oscillates between the solid- and dotted-line positions, respectively. Therefore, when the brush 22 is angularly moved back and forth over a certain position radially with respect to the abrasive cloth 3, the abrasive cloth 3 is napped in opposite directions at that position, allowing the clogging abrasive grains to be expelled effectively from the abrasive cloth 3 by the cleaning solution W and under the centrifugal forces.

As described above, inasmuch as the brush 22 is substantially radially moved back and forth over the abrasive cloth 3 and rotated about an axis substantially perpendicularly to the plane of the abrasive cloth 3, the dressing device shown in FIGS. 2 and 3 is more effective in removing the clogging abrasive grains from the abrasive cloth 3 than the conventional dressing devices shown in FIGS. 7(a), 7(b) and 8(a), 8(b). Therefore, the dressing device according to the present invention can remove the abrasive grains from the abrasive cloth 3 and hence dress the abrasive cloth 3 more effectively and reliably than the conventional dressing devices. The abrasive cloth 3 dressed by the dressing device according to the present invention has a longer service life, and can polish the entire surface of the workpiece 11 uniformly.

Figure 5:
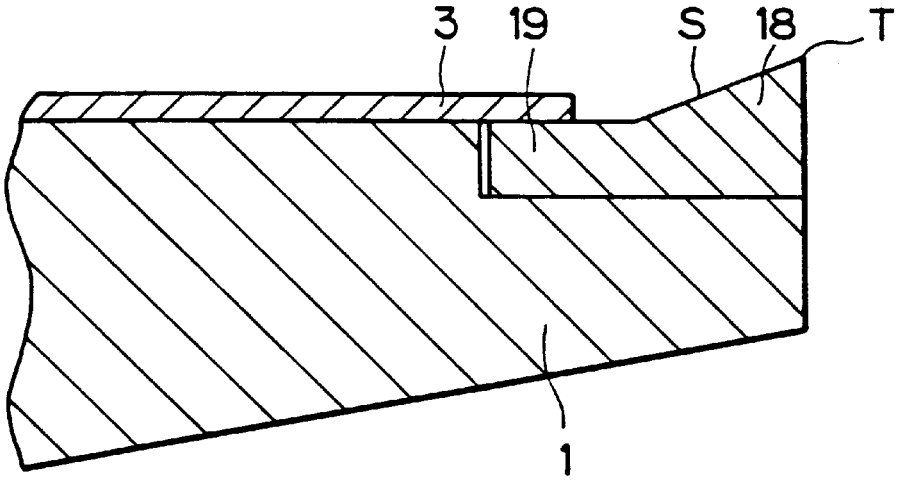
FIG. 5 is an enlarged partial cross-sectional view of a turntable of the polishing apparatus shown in FIG. 1.

The turntable 1 of the polishing apparatus will be described in detail below with reference to FIG. 5. As shown in FIG. 5, an annular solution retainer 19 with a radially outer raised bank 18 is mounted in an annular recess defined in an upper outer circumferential marginal edge of the turntable 1. The bank 18 has a slanted surface S inclined downwardly in the radially inward direction and has a crest T on its outer edge that is higher than the upper surface of the abrasive cloth by a distance ranging from 3 mm to 4 mm, for example.

While the polishing apparatus is not operating, i.e., the turntable 1 is stopped, a protective solution such as pure water is supplied to cover the abrasive cloth 3 to prevent the abrasive cloth 3 from drying. The protective solution which covers the abrasive cloth 3 is prevented by the bank 18 from flowing radially outwardly off the turntable 1 while the polishing apparatus is not in use. Since the abrasive cloth 3 is effectively prevented from drying when not in operation, its service life is increased. During subsequent polishing operation of the polishing apparatus, the turntable 1 is rotated, and the protective solution is scattered radially outwardly away from the turntable 1 under centrifugal forces. The slanted surface S permits the protective solution to flow smoothly over the bank 18 and be discharged from the turntable 1. Because the protective solution is substantially fully removed from the surface of the abrasive cloth 3, it does not obstruct the polishing process. However, since the abrasive cloth 3 still remains wet with the protective solution, the abrasive grains contained in the supplied abrasive material Q can uniformly be dispersed in the abrasive cloth 3 and hence can uniformly polish the workpiece 11.

The angle at which the slanted surface S is inclined and the height of the crest T are selected so as to allow the protective solution on the abrasive cloth 3 to be scattered quickly radially outwardly away from the turntable 1 when the turntable 1 is rotated in the polishing process.

Figure 6:
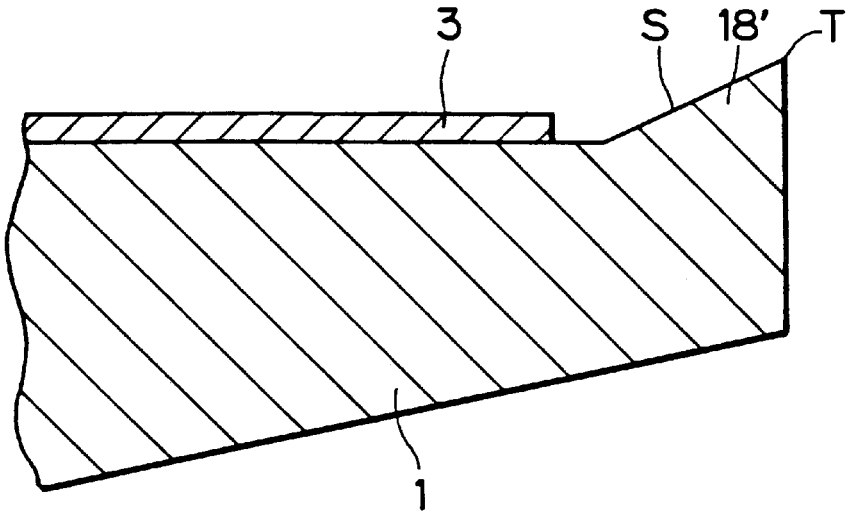
FIG. 6 is an enlarged partial cross-sectional view of a turntable according to another embodiment of the present invention.
Figure 7A:
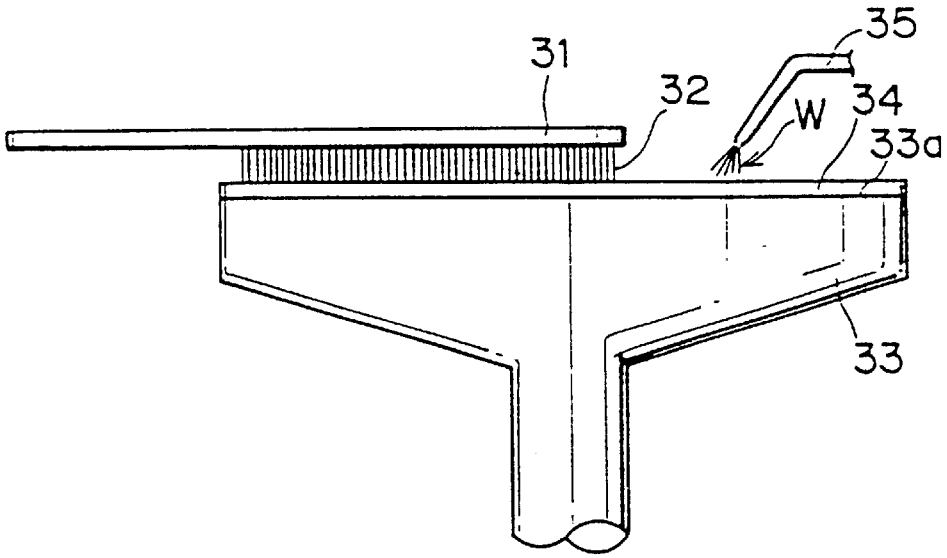
FIG. 7(a) PRIOR ART
FIG. 7(a) is a side view of a conventional dressing device combined with a polishing apparatus.
Figure 7B:
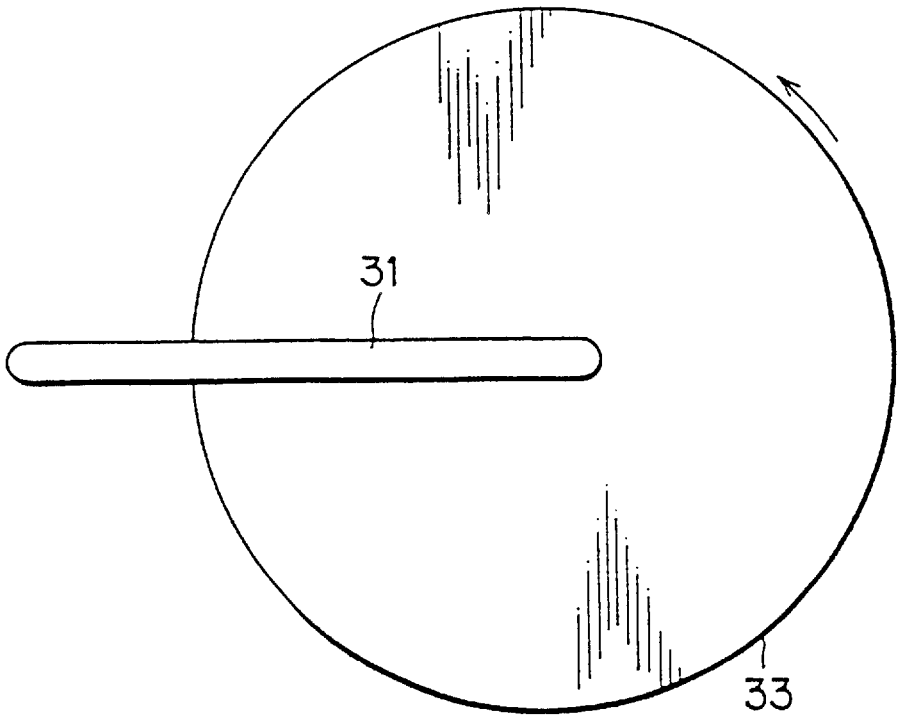
FIG. 7(b) PRIOR ART
FIG. 7(b) is a plan view of the conventional dressing device shown in FIG. 7(a)
Figure 8A:
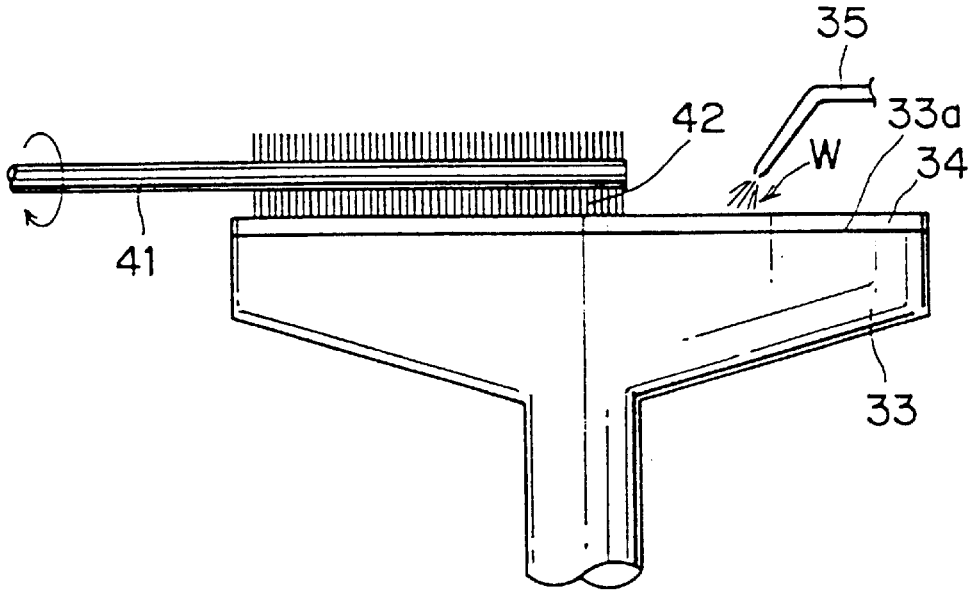
FIG. 8(a) PRIOR ART
FIG. 8(a) is a side view of another conventional dressing device combined with a polishing apparatus.
Figure 8B:
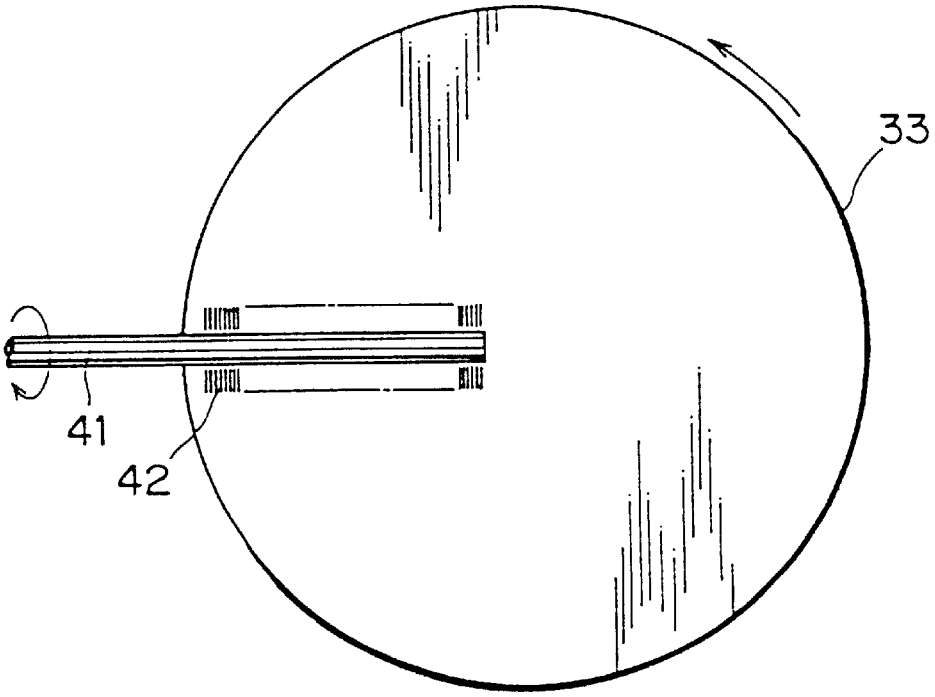
FIG. 8(b) PRIOR ART
FIG. 8(b) is a plan view of the conventional dressing device shown in FIG. 8(a)
Figure 9A:
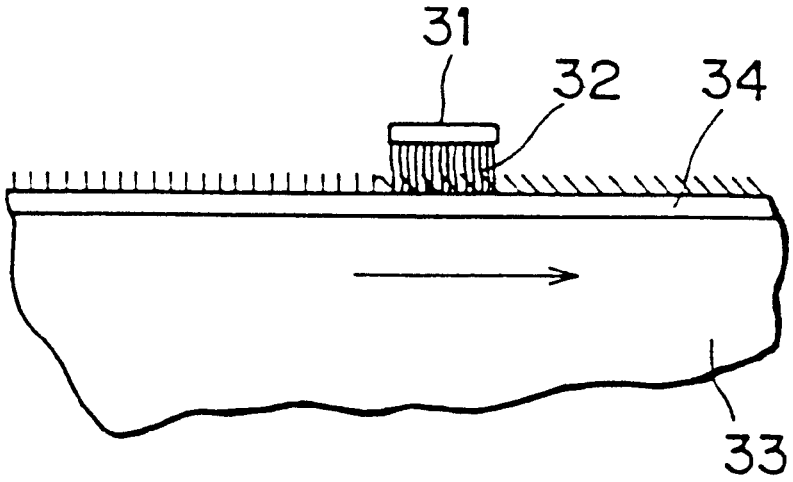
FIG. 9(a) PRIOR ART
FIGS. 9(a) and 9(b) are views showing the manner which the conventional dressing devices shown in FIGS. 7(b) and 8(a), 8(b) operate.
Figure 9B:
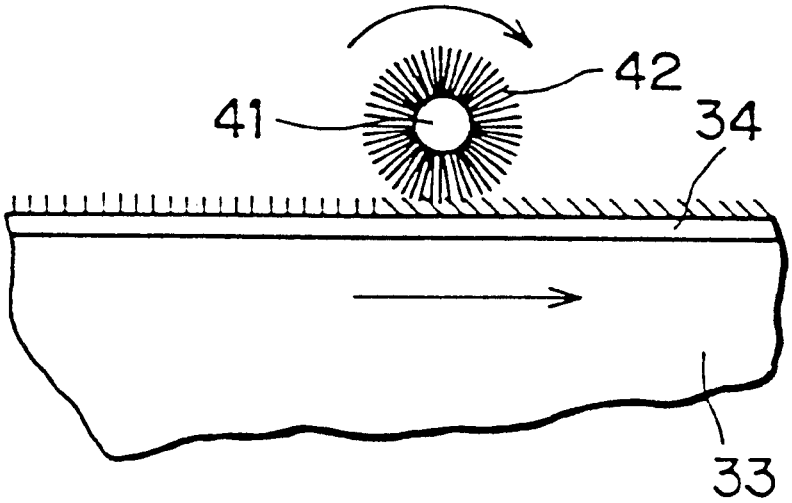
FIG. 9(b) PRIOR ART

FIG. 6 shows a turntable 1 according to another embodiment of the present invention. According to the embodiment shown in FIG. 6, the turntable 1 has an integrally formed annular raised bank 18' which is identical in shape to the raised bank 18 shown in FIG. 5. The raised bank 18' also has a slanted surface S and a crest T, and the angle at which the slanted surface S is inclined and the height of the crest T are also selected to allow the protective solution on the abrasive cloth 3 to be scattered quickly radially outwardly away from the turntable 1 upon rotation of the turntable i.

Although certain preferred embodiments of the present invention have been shown and described in detail, it should be understood that various changes and modifications may be made therein without departing from the scope of the appended claims.

What is claimed is:

1. A polishing apparatus for polishing a surface of a workpiece, comprising:

a turntable with an abrasive cloth mounted on an upper surface thereof;

[a top ring positioned above said turntable for supporting the workpiece to be polished and pressing the workpiece against said abrasive cloth;]

a rotatable brush*, being supported by an arm,* facing said abrasive cloth;

first actuating means for rotating said rotatable brush about an axis substantially perpendicularly to the plane of said abrasive cloth;

second actuating means for oscillating said rotatable brush substantially radially between radially inner and outer positions over said abrasive cloth; [and]

a nozzle for supplying a cleaning solution onto said abrasive cloth[.]*; and*

*a hydraulic cylinder capable of moving said rotatable brush upward and downward,*

*wherein said first actuating means includes a first motor located in the vicinity of a shaft supporting said arm, and an endless member for transmitting rotation of said first motor to said rotatable brush;*

*wherein said second actuating means includes a second motor for rotating said shaft supporting said arm,*

*wherein said arm has a first end and a second end, said first motor being located at said first end, while said rotatable brush being located at said second end,*

*wherein a first distance between said first motor and said arm supporting shaft is, along a plane along which said arm extends, less than a second distance between said arm supporting shaft and said rotatable brush.*

2. The polishing apparatus according to claim 1, wherein said second actuating means comprises an angularly movable arm supporting said brush on one end thereof and a swinging mechanism for oscillating said arm.

3. The polishing apparatus according to claim 1, further comprising means for vertically moving said rotatable brush toward and away from said abrasive cloth.

4. A polishing apparatus for polishing a surface of a workpiece, comprising:

a turntable with an abrasive cloth mounted on an upper surface thereof;

a top ring positioned above said turntable for supporting the workpiece to be polished and pressing the workpiece against said abrasive cloth; and a bank provided on said turntable along an outer circumferential edge thereof for preventing a protective solution, which is supplied to said abrasive cloth to keep the abrasive cloth from drying when said turntable is held at rest, from flowing off said turntable, said bank having a slanted surface inclined radially inwardly of said turntable for allowing the protective solution to be scattered away from said turntable over said slanted surface under centrifugal forces when said turntable is rotated.

5. The polishing apparatus according to claim 4, further comprising an annular solution retainer fixedly mounted on said turntable along said outer circumferential edge of the turntable, said bank being integrally formed on said annular solution retainer.

6. The polishing apparatus according to claim 4, wherein said bank is integrally formed on said turntable.

7. A polishing apparatus for polishing a surface of a workpiece, comprising:

a turntable with an abrasive cloth mounted on an upper surface thereof;

a top ring positioned above said turntable for supporting the workpiece to be polished and pressing the workpiece against said abrasive cloth;

a rotatable brush facing said abrasive cloth;

first actuating means for rotating said rotatable brush about an axis substantially perpendicular to the plane of said abrasive cloth;

second actuating means for reciprocally moving said rotatable brush substantially radially between radially inner and outer positions over said abrasive cloth;

a nozzle for supplying a cleaning solution onto said abrasive cloth; and a bank provided on said turntable along an outer circumferential edge thereof for preventing a protective solution, which is supplied to said abrasive cloth to keep the abrasive cloth from drying when said turntable is held at rest, from flowing off said turntable, said bank having a slanted surface inclined downwardly in a radially inward direction of said turntable for allowing the protective solution to be scattered away from said turntable over said slanted surface under centrifugal forces when said turntable is rotated.

8. The polishing apparatus according to claim 7, wherein said second actuating means comprises an angularly movable arm supporting said brush on one end thereof and a swinging mechanism for reciprocally swinging said arm.

9. The polishing apparatus according to claim 7, further comprising means for vertically moving said rotatable brush toward and away from said abrasive cloth.

10. The polishing apparatus according to claim 7, further comprising an annular solution retainer fixedly mounted on said turntable along said outer circumferential edge of the turntable, said bank being integrally formed on said annular solution retainer.

11. The polishing apparatus according to claim 7, wherein said bank is integrally formed on said turntable.

*12. A polishing apparatus for polishing a workpiece, comprising:*

*a rotatable turntable having a substantially circular abrasive cloth mounted on an upper surface thereof and a central axis thereof;*

*a rotatable substantially circular treating means being supported by an arm for treating said upper surface of said abrasive cloth, a rotatable surface of said rotatable circular treating means being parallel to that of said circular abrasive cloth;*

*an oscillatable arm means for holding said rotatable circular treating means over said upper surface of said abrasive cloth;*

*a first actuating means for rotating said rotatable circular treating means about an axis thereof substantially perpendicular to said rotatable surface of said circular abrasive cloth;*

*a second actuating means for oscillating said rotatable circular treating means substantially radially toward a first position and toward a second position on said circular abrasive cloth, said first position being said axis of said rotatable turntable and said second position being an outside periphery thereof,*

*a hydraulic cylinder capable of moving said rotatable circular treating means upward and downward,*

*wherein said first actuating means includes a first motor located in the vicinity of a shaft supporting said arm, and an endless member for transmitting rotation of said first motor to said rotatable substantially circular treating means,*

*wherein said second actuating means includes a second motor for rotating said shaft supporting said arm,*

*wherein said arm has a first end and a second end, said first motor being located at said first end, while said rotatable circular treating means being located at said second end,*

*wherein a first distance between said first motor and said arm supporting shaft is, along a plane along which said arm extends, less than a second distance between said arm supporting shaft and said rotatable circular treating means.*

*13. A process for treating a surface of a circular abrasive cloth on a turntable of a polishing apparatus, said process comprising the steps of:*

*rotating a rotatable treating means as well as said circular abrasive cloth on said turntable, said rotatable treating means being supported by an arm and being rotated by a first motor located in the vicinity of a shaft supporting said arm, and an endless member for transmitting rotation of said first motor to said rotatable treating means;*

*moving said rotatable treating means upward and downward with a hydraulic cylinder*

*pressing said rotatable treating means against said circular abrasive cloth of said turntable; and*

*oscillating said arm of said rotatable treating means substantially radially towards a first position and toward a second position on said circular abrasive cloth, said first position being an axis of said turntable and said second position being an outside periphery thereof, said oscillating said arm of said rotatable treating means being conducted by rotating said shaft supporting said arm with a second motor,*

*wherein said arm has a first end and a second end, said first motor being located at said first end, while said rotatable treating means being located at said second end,*

*wherein a first distance between said first motor and said arm supporting shaft is, along a plane along which said arm extends, less than a second distance between said arm supporting shaft and said rotatable treating means.*

*14. A polishing apparatus for polishing a surface of a workpiece, comprising:*

*a turntable with an abrasive cloth mounted on an upper surface thereof;*

*a rotatable brush, being supported by an arm, facing said abrasive cloth;*

*first actuator for rotating said rotatable brush about an axis substantially perpendicularly to the plane of said abrasive cloth;*

*second actuator for oscillating said rotatable brush substantially radially between radially inner and outer positions over said abrasive cloth;*

*a nozzle for supplying a cleaning solution onto said abrasive cloth; and*

*a hydraulic cylinder capable of moving said rotatable brush upward and downward,*

*wherein said first actuator includes a first motor located in the vicinity of a shaft supporting said arm, and an endless member for transmitting rotation of said first motor to said rotatable brush,*

*wherein said second actuator includes a second motor for rotating said shaft supporting said arm,*

*wherein said arm has a first end and a second end, said first motor being located at said first end, while said rotatable brush being located at said second end,*

*wherein a first distance between said first motor and said arm supporting shaft is, along a plane along which said arm extends, less than a second distance between said arm supporting shaft and said rotatable brush.*

*15. A polishing apparatus for polishing a workpiece, comprising:*

*a rotatable turntable having a substantially circular abrasive cloth mounted on an upper surface thereof and a central axis thereof;*

*a rotatable substantially circular treating tool, being supported by an arm, for treating said upper surface of said abrasive cloth, a rotatable surface of said rotatable circular treating tool being parallel to that of said circular abrasive cloth;*

*an oscillatable arm for holding said rotatable circular treating tool over said upper surface of said abrasive cloth;*

*a first actuator for rotating said rotatable circular treating tool about an axis thereof substantially perpendicular to said rotatable surface of said circular abrasive cloth;*

*a second actuator for oscillating said rotatable circular treating tool substantially radially toward a first position and toward a second position on said circular abrasive cloth, said first position being said axis of said rotatable turntable and said second position being an outside periphery thereof; and*

*a hydraulic cylinder capable of moving said rotatable circular treating tool upward and downward,*

*wherein said first actuator includes a first motor located in the vicinity of a shaft supporting said arm, and an endless member for transmitting rotation of said first motor to said rotatable substantially circular treating tool,*

*wherein said second actuator includes a second motor for rotating said shaft supporting said arm,*

*wherein said arm has a first end and a second end, said first motor being located at said first end, while said rotatable circular treating tool being located at said second end,*

*wherein a first distance between said first motor and said arm supporting shaft is, along a plane along which said arm extends, less than a second distance between said arm supporting shaft and said rotatable circular treating tool.*

*16. A process for treating a surface of a circular abrasive cloth on a turntable of a polishing apparatus, said process comprising the steps of:*

*rotating a rotatable treating tool as well as said circular abrasive cloth on said turntable, said rotatable treating tool being supported by an arm and being rotated by a first motor located in the vicinity of a shaft supporting said arm, and an endless member for transmitting rotation of said first motor to said rotatable treating tool;*

*moving said rotatable treating tool upward and downward with a hydraulic cylinder;*

*pressing said rotatable treating tool against said circular abrasive cloth of said turntable; and*

*oscillating said arm of said rotatable treating tool substantially radially toward a first position and toward a*

*second position on said circular abrasive cloth, said first position being an axis of said turntable and said second position being an outside periphery thereof, said oscillating said arm of said rotatable treating tool being conducted by rotating said shaft supporting said arm with a second motor,*

*wherein said arm has a first end and a second end, said first motor being located at said first end, while said rotatable treating tool being located at said second end,*

*wherein a first distance between said first motor and said arm supporting shaft is, along a plane along which said arm extends, less than a second distance between said arm supporting shaft and said rotatable treating tool.*

*17. A polishing apparatus for polishing a surface of a workpiece, comprising:*

*a turntable having a polishing surface on an upper surface thereof;*

*a top ring for supporting the workpiece to be polished and pressing the workpiece against said polishing surface; and*

*a bank disposed on outer circumferential edge of said turntable for preventing a protective solution, which is supplied to said polishing surface to keep said polishing surface from drying when said turntable is held at rest, from flowing off said turntable.*

*18. A polishing apparatus according to claim 17, wherein said protective solution is pure water.*

*19. A polishing apparatus for polishing a surface of a workpiece, comprising:*

*a turntable with an abrasive cloth mounted on an upper surface thereof;*

*a rotatable brush, being supported by an arm, facing said abrasive cloth;*

*first actuating means for rotating said rotatable brush about an axis substantially perpendicularly to the plane of said abrasive cloth;*

*second actuating means for oscillating said rotatable brush substantially radially between radially inner and outer positions over said abrasive cloth;*

*a nozzle for supplying a cleaning solution onto said abrasive cloth; and*

*a hydraulic cylinder capable of moving said rotatable brush upward and downward,*

*wherein said first actuating means includes a first motor located in the vicinity of a shaft supporting said arm, and an endless member for transmitting rotation of said first motor to said rotatable brush,*

*wherein said second actuating means includes a second motor for rotating said shaft supporting said arm,*

*wherein said arm has a first end and a second end, said first motor being located at said first end, while said rotatable brush being located at said second end,*

*wherein said arm supporting shaft supports said arm along another axis,*

*wherein a first distance between said first motor and said another axis is, along a plane along which said arm extends, less than a second distance between said another axis and said rotatable brush.*

*20. A polishing apparatus for polishing a workpiece, comprising:*

*a rotatable turntable having a substantially circular abrasive cloth mounted on an upper surface thereof and a central axis thereof;*

*a rotatable substantially circular treating means being supported by an arm for treating said upper surface of said abrasive cloth, a rotatable surface of said rotatable circular treating means being parallel to that of said circular abrasive cloth;*

*an oscillatable arm means for holding said rotatable circular treating means over said upper surface of said abrasive cloth;*

*a first actuating means for rotating said rotatable circular treating means about an axis thereof substantially perpendicular to said rotatable surface of said circular abrasive cloth;*

*a second actuating means for oscillating said rotatable circular treating means substantially radially toward a first position and toward a second position on said circular abrasive cloth, said first position being said axis of said rotatable turntable and said second position being an outside periphery thereof,*

*a hydraulic cylinder capable of moving said rotatable circular treating means upward and downward,*

*wherein said first actuating means includes a first motor located in the vicinity of a shaft supporting said arm, and an endless member for transmitting rotation of said first motor to said rotatable substantially circular treating means,*

*wherein said second actuating means includes a second motor for rotating said shaft supporting said arm,*

*wherein said arm has a first end and a second end, said first motor being located at said first end, while said rotatable circular treating means being located at said second end,*

*wherein said arm supporting shaft supports said arm along another axis,*

*wherein a first distance between said first motor and said another axis is, along a plane along which said arm extends, less than a second distance between said another axis and said rotatable circular treating means.*

*21. A process for treating a surface of a circular abrasive cloth on a turntable of a polishing apparatus, said process comprising the steps of:*

*rotating a rotatable treating means as well as said circular abrasive cloth on said turntable, said rotatable treating means being supported by an arm and being rotated by a first motor located in the vicinity of a shaft supporting said arm, and an endless member for transmitting rotation of said first motor to said rotatable treating means;*

*moving said rotatable treating means upward and downward with a hydraulic cylinder*

*pressing said rotatable treating means against said circular abrasive cloth of said turntable; and*

*oscillating said arm of said rotatable treating means substantially radially toward a first position and toward a second position on said circular abrasive cloth, said first position being an axis of said turntable and said second position being an outside periphery thereof, said oscillating said arm of said rotatable treating means being conducted by rotating said shaft supporting said arm with a second motor,*

*wherein said arm has a first end and a second end, said first motor being located at said first end, while said rotatable treating means being located at said second end,*

*wherein said arm supporting shaft supports said arm along another axis,*

*wherein a first distance between said first motor and said another axis is, along a plane along which said arm extends, less than a second distance between said another axis and said rotatable treating means.*

*22. A polishing apparatus for polishing a surface of a workpiece, comprising:*

*a turntable with an abrasive cloth mounted on an upper surface thereof;*

*a rotatable brush, being supported by an arm, facing said abrasive cloth;*

*first actuator for rotating said rotatable brush about an axis substantially perpendicularly to the plane of said abrasive cloth;*

*second actuator for oscillating said rotatable brush substantially radially between radially inner and outer positions over said abrasive cloth;*

*a nozzle for supplying a cleaning solution onto said abrasive cloth; and*

*a hydraulic cylinder capable of moving said rotatable brush upward and downward,*

*wherein said first actuator includes a first motor located in the vicinity of a shaft supporting said arm, and an endless member for transmitting rotation of said first motor to said rotatable brush,*

*wherein said second actuator includes a second motor for rotating said shaft supporting said arm, wherein said arm has a first end and a second end, said first motor being located at said first end, while said rotatable brush being located at said second end,*

*wherein said arm supporting shaft supports said arm along another axis,*

*wherein a first distance between said first motor and said another axis is, along a plane along which said arm extends, less than a second distance between said another axis and said rotatable brush.*

*23. A polishing apparatus for polishing a workpiece, comprising:*

*a rotatable turntable having a substantially circular abrasive cloth mounted on an upper surface thereof and a central axis thereof;*

*a rotatable substantially circular treating tool, being supported by an arm, for treating said upper surface of said abrasive cloth, a rotatable surface of said rotatable circular treating tool being parallel to that of said circular abrasive cloth;*

*an oscillatable arm for holding said rotatable circular treating tool over said upper surface of said abrasive cloth;*

*a first actuator for rotating said rotatable circular treating tool about an axis thereof substantially perpendicular to said rotatable surface of said circular abrasive cloth;*

*a second actuator for oscillating said rotatable circular treating tool substantially radially toward a first position and toward a second position on said circular abrasive cloth, said first position being said axis of said rotatable turntable and said second position being an outside periphery thereof; and*

*a hydraulic cylinder capable of moving said rotatable circular treating tool upward and downward,*

*wherein said first actuator includes a first motor located in the vicinity of a shaft supporting said arm, and an endless member for transmitting rotation of said first motor to said rotatable substantially circular treating tool,*

*wherein said second actuator includes a second motor for rotating said shaft supporting said arm,*

*wherein said arm has a first end and a second end, said first motor being located at said first end, while said rotatable circular treating tool being located at said second end,*

*wherein said arm supporting shaft supports said arm along another axis,*

*wherein a first distance between said first motor and said another axis is, along a plane along which said arm extends, less than a second distance between said another axis and said rotatable circular treating tool.*

*24. A process for treating a surface of a circular abrasive cloth on a turntable of a polishing apparatus, said process comprising the steps of:*

*rotating a rotatable treating tool as well as said circular abrasive cloth on said turntable, said rotatable treating tool being supported by an arm and being rotated by a first motor located in the vicinity of a shaft supporting said arm, and an endless member for transmitting rotation of said first motor to said rotatable treating tool;*

*moving said rotatable treating tool upward and downward with a hydraulic cylinder;*

*pressing said rotatable treating tool against said circular abrasive cloth of said turntable; and*

*oscillating said arm of said rotatable treating tool substantially radially toward a first position and toward a second position on said circular abrasive cloth, said first position being an axis of said turntable and said second position being an outside periphery thereof, said oscillating said arm of said rotatable treating tool being conducted by rotating said shaft supporting said arm with a second motor,*

*wherein said arm has a first end and second end, said first motor being located at said first end, while said rotatable treating tool being located at said second end,*

*wherein said arm supporting shaft supports said arm along another axis,*

*wherein a first distance between said first motor and said another axis is, along a plane along which said arm extends, less than a second distance between said another axis and said rotatable treating tool.*

* * * * *

UNITED STATES PATENT AND TRADEMARK OFFICE

CERTIFICATE OF CORRECTION

PATENT NO. : RE 38,228 E
APPLICATION NO. : 08/789304
DATED : August 19, 2003
INVENTOR(S) : Hirose et al.

It is certified that error appears in the above-identified patent and that said Letters Patent is hereby corrected as shown below:

On the title page; in Item (54) the Title,

Insert --*AND METHOD*-- after "POLISHING APPARATUS".

On the page of Specification;

Delete Column 11, line 14 through 28 and insert the following text:

*17. A method for polishing a surface of a workpiece, comprising the steps of:*
*rotating a turntable having a polishing surface on an upper surface thereof;*
*supporting, with a top ring, the workpiece to be polished and pressing the workpiece against said polishing surface; and*
*keeping said polishing surface from drying when said turntable is held at rest, wherein the step of keeping said polishing surface from drying includes the steps of supplying a protective solution to said polishing surface when said turntable is held at rest and preventing said protective solution from flowing off said turntable by providing a bank disposed on outer circumferential edge of said turntable.*

*18. The method according to claim 17, wherein the step of supplying said protective solution to said polishing surface when said turntable is held at rest includes a step of supplying pure water to said polishing surface.*

Signed and Sealed this

Second Day of January, 2007

JON W. DUDAS
*Director of the United States Patent and Trademark Office*